United States Patent Office 3,824,137
Patented July 16, 1974

3,824,137
SOLUTION AGITATION PROCESS
Hendrik F. Bok, Fairhaven, and Eugene St. Onge, Freetown, Mass., assignors to In-Line Technology, Inc., Assonet, Mass.
Filed Apr. 18, 1973, Ser. No. 352,399
Int. Cl. B08b 3/00; C23b 5/02; C23f 1/00
U.S. Cl. 156—18
10 Claims

ABSTRACT OF THE DISCLOSURE

A solution agitation process and system to provide a uniform and controlled turbulent flow of treatment liquid over both sides of a flat substrate which is suspended in a treatment solution, wherein a directed liquid spray pattern below the treatment solution level creates parallel, flowing walls of solution running downward through the tank and on each opposite side of the substrate.

BACKGROUND OF THE INVENTION

Heretofore difficulties have been encountered in the treatment of flat substrates, such as in the photo fabrication of thin film circuits on glass or ceramic substrates. A particular need exists for the present solution agitation process in the areas of, for example, chemical cleaning of substrates; development of exposed photo-resist; chemical etching of thin film circuits; and high speed plating. Previous processes have involved, such as, simple immersion in a tank of treating solution; ultrasonic agitation of the treatment solution; spray application of treatment solution against the substrate, and attempts have been made for control of the nature and flow rates of the treatment solution. Such hitherto known processes, however, have not been entirely satisfactory.

The present invention overcomes these drawbacks and provides a new and novel solution agitation process resulting in high efficiency and meritorious end treatment results.

BRIEF DESCRIPTION OF THE INVENTION

The novel solution agitation process and system of the invention provides a uniform, controlled turbulent flow of liquid over both sides of a flat substrate that is suspended in a treatment solution. The substrate size may vary within the area of, for example, 1" x 1" to over 2' x 2', and this uniform, controlled turbulent flow is particularly useful in the photo fabrication of thin film circuits on glass or ceramic substrates. The present process utilizes a high-volume, high pressure pump that draws solution from one or more drains, at the bottom of a tank. The pump effluent is piped to a dual manifold that is positioned on opposite sides of the tank. The manifold contains spray nozzles that give a flat overlapping spray pattern. The manifold and nozzles are positioned parallel to and just below the solution surface. The spray nozzles are aimed toward the bottom of the tank so that the flat spray pattern is parallel to the side walls of the tank. Each manifold contains a valve that allows the flow of solution to each manifold to be balanced.

The intake side of the pump is connected to a pump bypass line which is connected to the effluent side of the pump. The bypass line contains a valve to allow regulation of the amount of liquid being drawn through the high volume, high pressure pump. When the pump is turned on, the solution is drawn off from the bottom of the tank and is delivered to each manifold on each side of the tank. The solution is sprayed out of the spray nozzles just below the solution level. This directed spray pattern below the solution level provides two parallel, flowing walls of solution running from the top of the tank to the bottom of the tank. Placement of the nozzles below the solution surface eliminates any frothing of the solution and imparts a very smooth rolling surface to the solution. The solution pressure in each manifold is determined by pressure gauges mounted in each manifold. The rate of solution flow in the manifolds is controlled by adjusting the manifold and pump bypass valves. An additional control feature is incorporated wherein each manifold is mounted on an elbow which allows the spacing between the manifolds to be adjusted. Solution temperature in the tank can be controlled by a thermostatically monitored heater located at the bottom of the tank.

Additional and further objects and advantages of the invention will be more readily apparent from the following detailed description of specific applications of the novel solution agitation process when taken together with the accompanying exemplary drawings in which.

Figure 1:
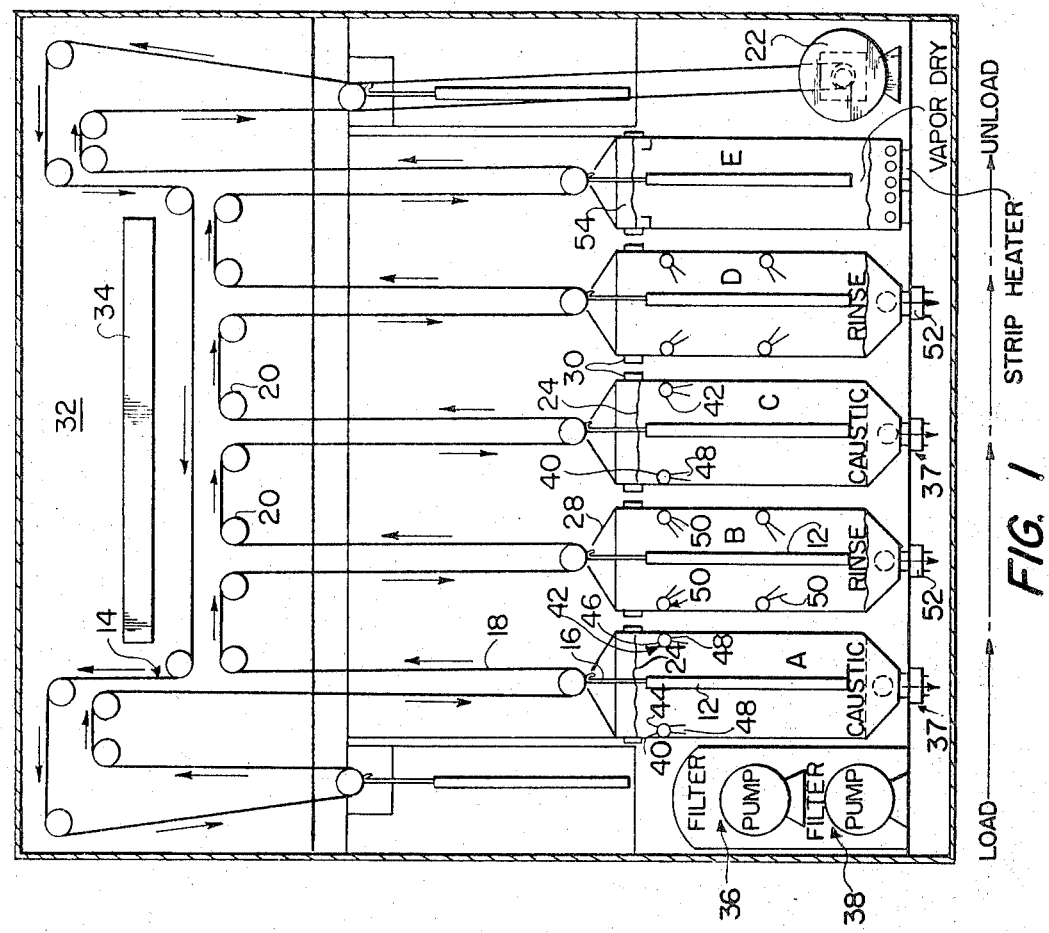
FIG. 1 is a schematic view of a typical photo-resist stripping line for large glass substrates utilizing the solution agitation process of the invention.
Figure 2:
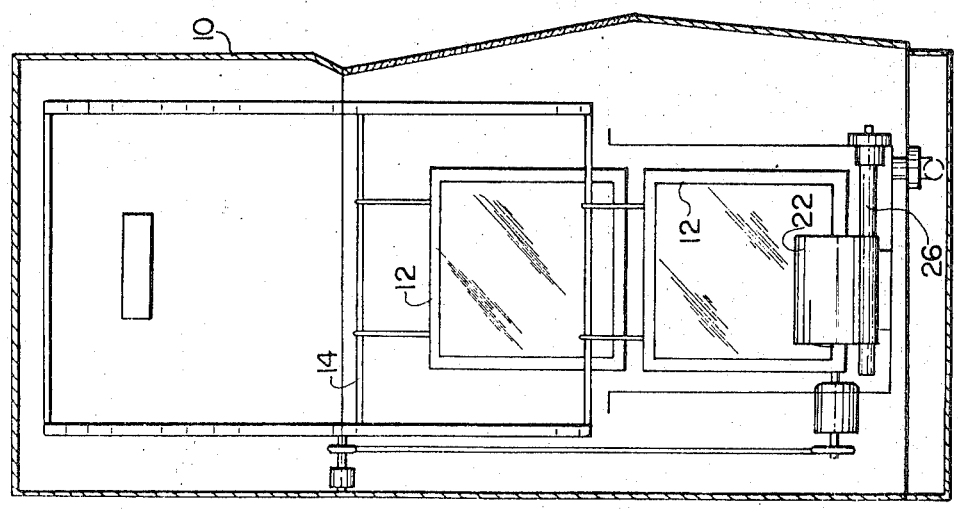
FIG. 2 is a schematic sectional view through FIG. 1 at right angles thereto.

Referring now in more detail to the drawings, the typical photo-resist stripping line for large glass substrates as shown in FIGS. 1 and 2 generally shows a housing at 10 in which are mounted in a line sequence a plurality of treating tanks A, B, C, D and E for containing a treating solution and into which the individual substrate pieces or sections 12 are immersed for treatment. The substrate sections 12 are carried in a usual manner by a traverse mechanism generally designated 14 which suspends the individual substrate pieces 12 by hooks or the like 16 suspended from endless conveyor 18 operatively mounted on rollers or the like 20 in a known manner and the traverse mechanism being operatively driven by a motor 22. The individual tanks contain desired treatment liquids with the level liquid in the tanks being indicated at 24. Particulars of such individual tanks are shown in greater detail in FIGS. 5–8. Solution heater units 26 are provided for the individual tanks.

The individual tanks are provided with hinged covers 28 and cooling jackets as at 30. The housing includes an exhaust hood 32 and light fixture 34. Filter and pump units are operatively incorporated in the treatment solution lines as shown at 36 and 38 as will be described in greater detail hereinafter. In this embodiment of FIG. 1, tanks A and C, which contain a treating solution in the nature of a caustic and which have centrally located drains to pumps as indicated at 37 incorporate the solution agitation process of the present inventon and which, as broadly indicated at 40 and 42, have spray nozzles appropriately manifolded and through which the treatment solution is pumped. The system is in the nature of a dual manifold positioned on opposite sides of the tank and the manifold contains spray nozzles that give a flat overlapping spray pattern. Arrangement is shown in greater detail in FIG. 6, the individual manifolds being indicated at 44 and 46 from which a plurality of high output flat wide angle spray nozzles 48 operatively spray the solution.

Tanks B and D constitute rinse tanks with a rinsing solution being sprayed from spray nozzles 50 against opposite sides of the substrate sections 12 with the rinse solution going therefrom to drain as indicated at 52. Tank E constitutes a vapor dry tank with the vapor level being indicated at 54 and the tank includes a strip heater 56.

In the development of exposed photo-resist it is very important that all the exposed resist be evenly dissolved off the substrate. Any residual photo-resist left in the substrate will interfere with subsequent etching operations. Previous methods for developing photo-resist included (a) simple immersion in a tank of developer; (b) developing in an ultrasonically agitated solution; (c) developing in a vapor degreaser; and (d) spray developing. Development by simple immersion leaves a residue of exposed resist which interferes with subsequent etching. Development by an ultrasonically agitated solution becomes difficult with large substrates since multiple transducers are required to give uniform ultrasonic action to a large volume of developing solution.

Developing in a vapor degreaser is difficult with large substrates, since once the substrate has reached the vapor temperature, no further condensation of the developing solution occurs on the substrate. Spray developing is wasteful of expensive developing solution. It is also difficult to get an even spray pattern over large substrates, i.e., 2' x 2'.

These drawbacks are overcome in the present novel solution agitation process which supplies a uniform, vigorous, solvating action simultaneously to all reas of the exposed resist on the substrate surface. This results in very clean and rapid development of the exposed resist. This new development process is particularly suited to give very even development for fine line work, i.e., from one micron up to three mil lines on substrates that range in size from 1" x 1" to over 2' x 2'.

This action is more clearly shown in FIGS. 5–8 inclusive, showing the tank A with manifolds 44 and 46 mounted therein on opposite sides of the tank and of the substrate sections 12 with the spray nozzles 48 operatively depending therefrom. These spray nozzles are so designed and positioned as to give a flat overlapping spray pattern. The manifolds and nozzles are positioned parallel to and just below the liquid level 24 with the spray nozzles aimed toward the bottom of the tank so that the flat spray pattern is parallel to the side walls of the tank. The high volume, high pressure pump 38 draws solution from one or more drains 37 at the bottom of the tank and the pump effluent is piped to the dual manifold 40, 42 through a filter box 58 which contains filter media of appropriate substance. Each manifold contains a ball valve or the like 60 that allows the flow of solution to each manifold to be balanced. The intake side of pump 38 is connected to a pump bypass line 62 which is connected to the effluent side of the pump. The bypass line contains a valve 64 to allow regulation of the amount of liquid being drawn through the high volume, high pressure pump. When the pump is turned on, the solution is drawn off from the bottom of the tank and is delivered to each manifold on each side of the tank. The solution is sprayed out of the spray nozzles just below the solution level. This directed spray pattern below the solution level provides two parallel, flowing walls of solution as generally indicated at 66 and 68 in FIG. 8, with the flowing walls running from the top of the tank to the bottom of the tank. Having the nozzles below the solution surface eliminates any frothing of the solution and imparts a very smooth rolling surface to the solution as shown. Pressure gauges 70 mounted in each manifold determine the solution pressure in each manifold. The rate of solution flow in the manifold is controlled by adjusting the manifold and pump bypass valves. An additional control feature resides in the use of mounting each manifold on an elbow 72 which allows the spacing between the manifolds to be adjusted. Solution temperature in the tank is controlled by the heaters 26 located at the bottom of the tanks and which are thermostatically monitored.

The present invention is also ideally suited in the area of chemical cleaning. Previous methods of applying the cleaning solution included, for example, (a) simple immersion in a tank of cleaning solution; (b) ultrasonic agitation of the cleaning solution; and (c) spraying the cleaning solution against the substrate. Simple immersion does not provide any scrubbing action and with large substrates, i.e., 1' x 1' and over, it is difficult to achieve uniform ultrasonic agitation over the entire substrate surface. Spraying of cleaning solution against the substrate creates heavy misting and is wasteful of cleaning solution.

These drawbacks are overcome in the present novel solution agitation process which supplies a uniform vigorous scrubbing action to all areas of the substrate surface. This uniform, evenly dispersed scrubbing action is very effective in removing soils from the substrates.

Figure 3:
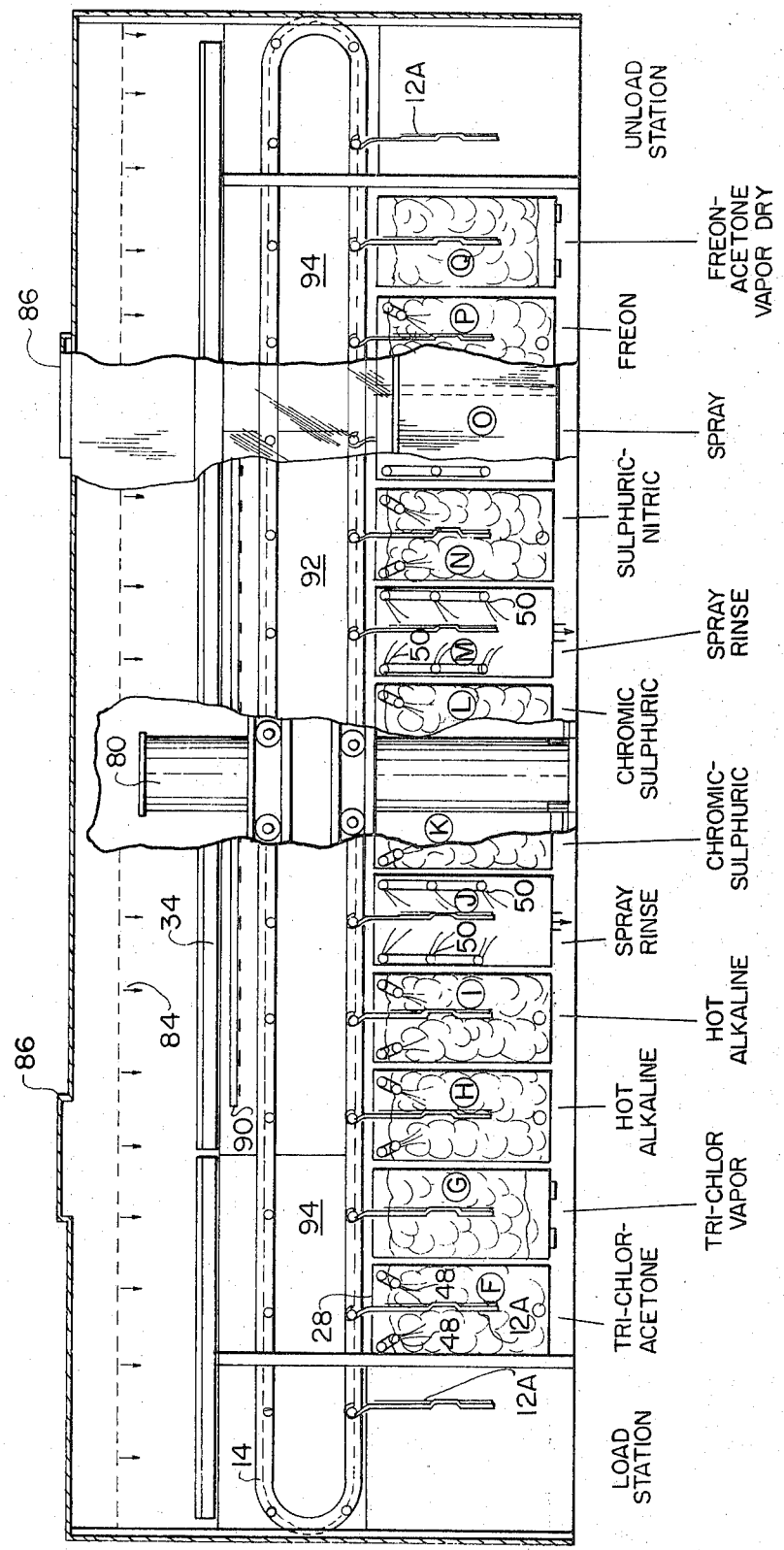
FIG. 3 is a schematic view of a typical cleaning line for large glass substrates, incorporating the solution agitation process of the invention.
Figure 4:
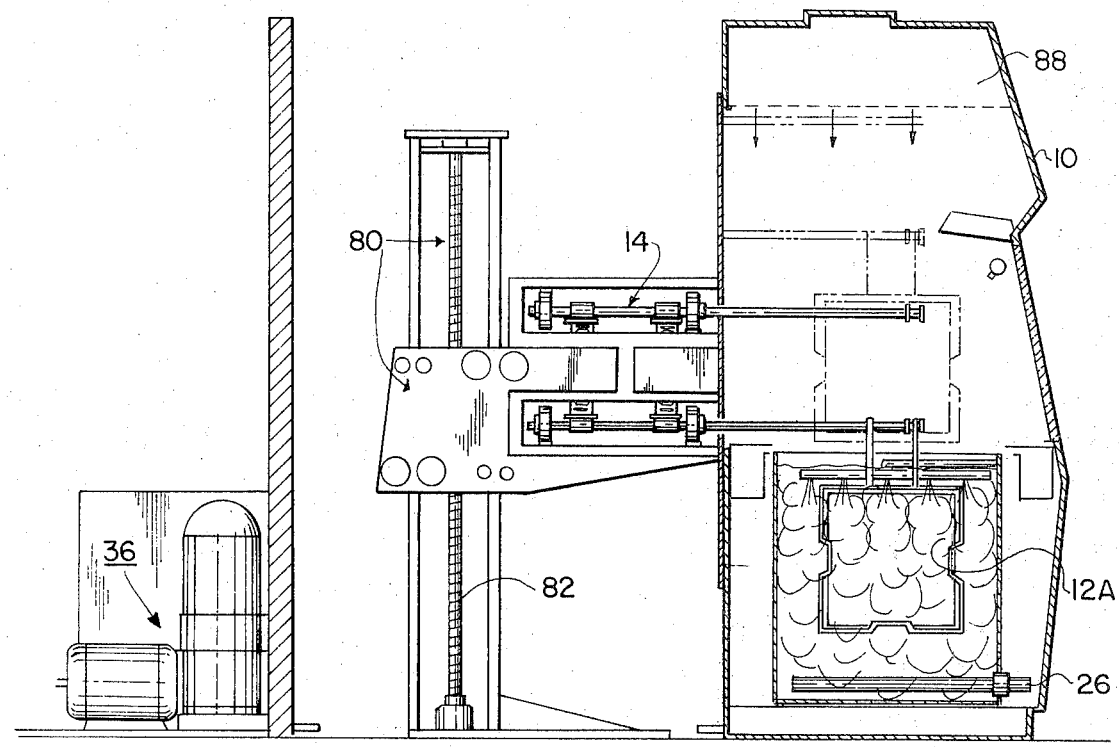
FIG. 4 is a sectional view through the system of FIG. 3 at right angles thereto.
Figure 5:
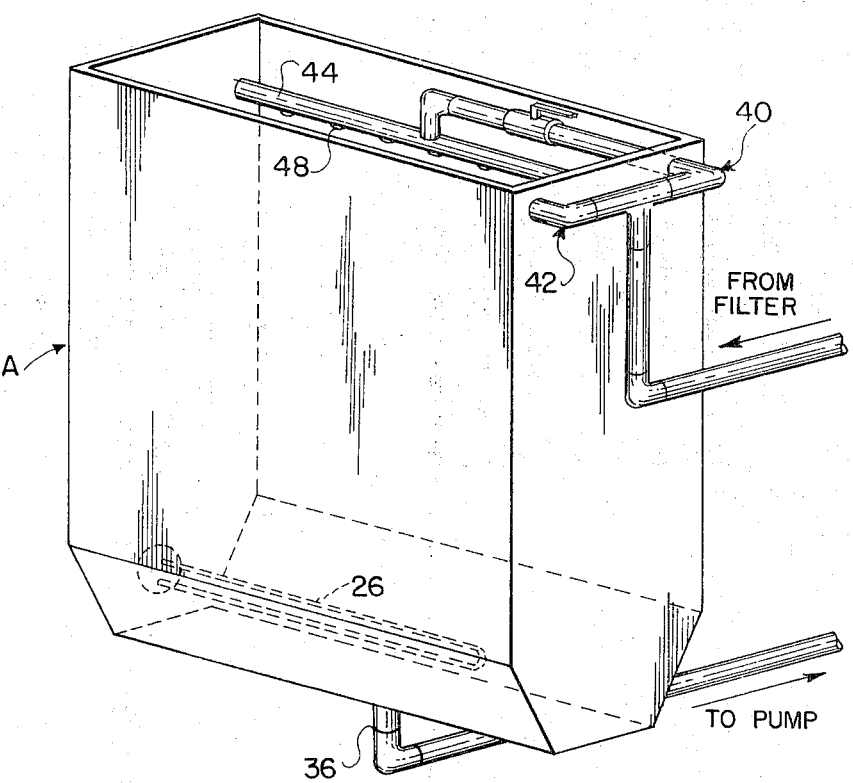
FIG. 5 is a perspective view of a typical treatment tank in accordance with the invention.
Figure 6:
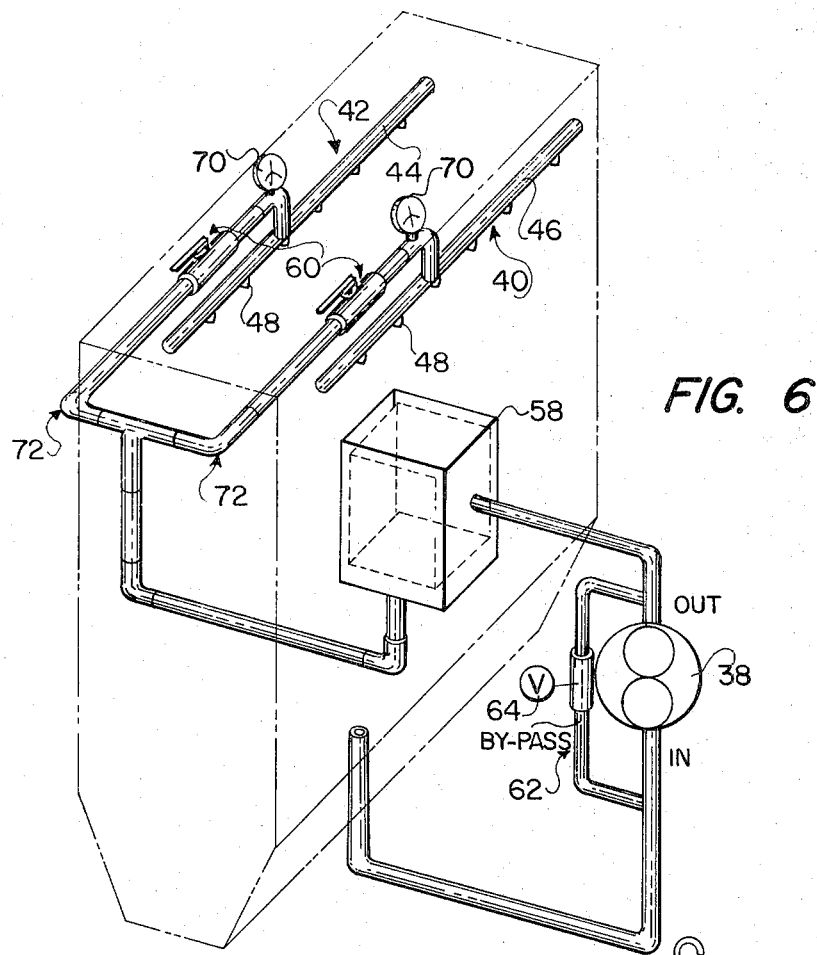
FIG. 6 is a perspective view of a typical tank as shown in FIG. 5 with connection details and flow circuits illustrated.
Figure 7:
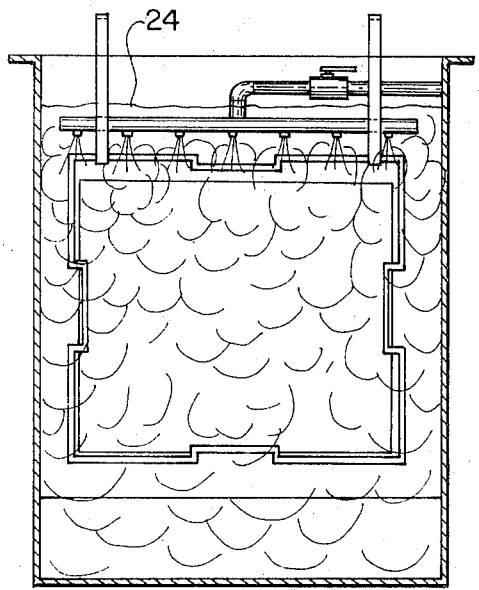
FIG. 7 is a longitudinal sectional view through a typical tank illustrating the treatment solution flow pattern.
Figure 8:
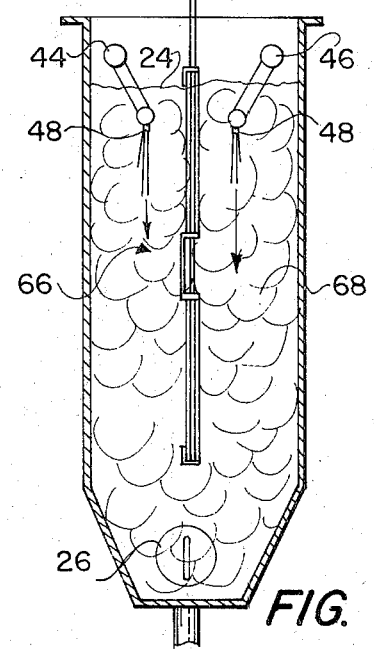
FIG. 8 is a sectional view through a tank taken at right angles to FIG. 7.

FIGS. 3 and 4 of the drawings show a typical cleaning line for large glass substrates, The same principles are involved in this embodiment as regards the spray action in various of the tanks and like reference characters are applied to like parts in this embodiment. As shown in FIG. 3, the large glass substrates 12A are carried through the cover enclosure 10 by a traverse mechanism 14 and the apparatus further includes a lift mechanism generally designated 80 which includes a precision ball screw 82 and which apparatus serves for appropriately vertically positioning the traverse mechanism. This embodiment additionally incorporates a filtered air supply at 84 from filtered air supply duct 86 with the air being supplied to a filtered air supply plenum chamber 88. This embodiment further incorporates moisturizing nozzles generally indicated at 90 so as to maintain saturated air in the region 92. Ambient humidity is controlled at 94 as distinguished from the saturated air medium at 92.

In this embodiment the tanks F, H, I, K, L, N and P utilize the spray nozzles 48 similar in design and function as hereinbefore described, whereas in others of the chambers J, M and O, rinsing nozzles 50 are utilized. Chamber G is devoid of nozzles and chamber Q is for vapor dry.

The invention is also useful in the chemical etching of thin film circuits. Uniform etching is very important in etching thin film circuits. The thin film deposits may range from 1,000 Angstroms to 20,000 Angstroms. Etched line width may range from .5 mil to 3 mils. Previous chemical etching processes included, (a) simple immersion etching; (b) paddle or splash etching; and (c) spray etching, either horizontally or vertically.

Simple immersion etching does not provide a uniform etch. The reaction products remain at the surface and interfere with continued etching. Paddle or splash etching gives erratic results since the etching solution is not dispersed evenly over the substrate being etched. Spray etching is not very well suited to fine line work on large substrates, i.e., up to 2' x 2', since it is difficult to provide a uniform spray pattern at the same pressure over all the substrate simultaneously. With fine line etching, the variation in spray pattern and pressure results in severe undercutting and line etch-out.

The novel solution agitation process as described above provides a very uniform and even etching of thin-film circuitry patterns on panels up to 2' x 2'. The parallel flowing walls of etching solution create slight eddy current effluents across the surface of the panel being etched. Thus, reaction products are constantly removed from the etched surface. The freshly exposed surface continues to etch uniformly. With this etching process, thin-film circuits having 1 mil wide lines on 2' x 2' substrates can be easily fabricated. Undercutting is minimum.

The present invention is also ideally applicable to high speed plating. Present electroplating practice limits the applied current density, and thus the amount of metal that can be deposited in a given time in a still or slow moving plating solution. It has been shown that by greatly increasing the plating solution flow rate, the applied current density and thus the plating speed can be increased considerably. However, no practical method for moving large volumes of plating solution uniformly between the anode and cathode in a large plating tank has been available prior to the present invention.

The present novel solution agitation process of the invention makes possible a uniform, high-flow rate of plating solution. By placing the solution return manifolds at the front and back of the tank and withdrawing the plating solution from centered, evenly spaced bottom drain ports, a high-volume plating solution flow rate is readily achieved between the cathode and anode in the plating tank. This arrangement permits the utilization of a high current density, without burning the parts being plated, and therefore an increased plating speed.

While specific applications of the novel features of the present invention have been hereinbefore described and shown in the drawings, obviously the principles are more broadly applicable and will be obvious to those skilled in the art. Changes and modifications in detail can be effected without departing from the spirit and scope of the invention as defined in and limited by the appended claims.

We claim:

1. A solution agitation process for treating substrates and the like, comprising:
   (A) suspending a flat sided substrate to be treated in a treatment solution; and
   (B) implementing a uniform and controlled turbulent flowing wall of the treatment solution downwardly over the extent of the sides of the substrate, from top to bottom of the substrate, and parallel to the sides thereof.

2. A solution agitation process as claimed in claim 1, wherein spray nozzles, having flat spray openings therein parallel to the sides of said substrate are positioned on opposite sides of the substrate below the surface of the treatment solution and the spray openings being configured to create a flat overlapping spray pattern therefrom below the solution surface directed downwardly from top to bottom of the substrate.

3. A solution agitation process as claimed in claim 2, wherein the directed spray pattern provides two parallel flowing walls of solution running from the top of the substrate to the bottom along opposite sides of the substrate.

4. A solution agitation process as claimed in claim 3, wherein the flow along the substrate surfaces is in the nature of a smooth, rolling treatment surface.

5. A solution agitation process as claimed in claim 4, including balancing the flow of treatment solution on the opposite sides of the substrate.

6. A solution agitation process as claimed in claim 5 for chemical cleaning of substrates used in thin film device fabrication, wherein the solution treatment flow supplies a uniform, vigorous scrubbing action to all areas of the substrate surface with the uniform, evenly dispersed scrubbing action effectively removing soils from the substrates.

7. A solution agitation process as claimed in claim 5 for chemical etching of thin film circuits, wherein the parallel flowing walls of etching treatment solution create slight eddy current effluents across the surface of the panel being etched, with reaction products being constantly removed from the etched surface, with the freshly exposed surface continuing to etch uniformly, and undercutting is minimized.

8. A solution agitation process as claimed in claim 5 for high speed electroplating, wherein the flow is a uniform, high-flow rate of plating solution permitting utilization of a higher current density without burning the parts being plated and with resultant increased plating speed.

9. A solution agitation process as claimed in claim 5, including monitoring and controlling temperature of the treatment solution.

10. A solution agitation process as claimed in claim 9 for developing exposed photo-resist wherein the flow supplies a uniform, vigorous solvating action simultaneously to all areas of the exposed resist on the substrate surface with resultant clean and rapid development of the exposed resist.

References Cited
UNITED STATES PATENTS

| | | | |
|---|---|---|---|
| 563,093 | 6/1896 | Szontagh et al. | 204—273 |
| 950,973 | 3/1910 | Wallace | 204—237 |
| 1,431,022 | 10/1922 | Mumford | 204—273 X |
| 2,484,068 | 10/1949 | Booe | 204—237 X |
| 3,483,568 | 12/1969 | Andersen et al. | 204—237 X |

GERALD L. KAPLAN, Primary Examiner

U.S. Cl. X.R.

134—34, 198; 156—2; 204—1 R, 45 R, 237, 273